(12) United States Patent  (10) Patent No.: US 8,488,231 B2
Shimizu et al.  (45) Date of Patent: Jul. 16, 2013

(54) GENERATOR OF POLARIZATION ENTANGLED PHOTON PAIRS AND METHOD OF GENERATING THE SAME

(75) Inventors: Ryosuke Shimizu, Miyagi (JP); Keiichi Edamatsu, Miyagi (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 8 days.

(21) Appl. No.: 13/376,107

(22) PCT Filed: Jun. 3, 2010

(86) PCT No.: PCT/JP2010/059461
§ 371 (c)(1),
(2), (4) Date: Feb. 8, 2012

(87) PCT Pub. No.: WO2010/140661
PCT Pub. Date: Dec. 9, 2010

(65) Prior Publication Data
US 2012/0134377 A1 May 31, 2012

(30) Foreign Application Priority Data
Jun. 3, 2009 (JP) ................................ 2009-134293

(51) Int. Cl.
*G02F 1/35* (2006.01)
*H04L 9/00* (2006.01)

(52) U.S. Cl.
USPC ............ 359/330; 359/326; 380/256; 380/263

(58) Field of Classification Search
USPC .......................................... 359/330; 380/263
See application file for complete search history.

(56) References Cited

U.S. PATENT DOCUMENTS

2007/0098174 A1* 5/2007 Trifonov et al. .............. 380/256
2008/0063015 A1* 3/2008 Trifonov et al. ................ 372/18

FOREIGN PATENT DOCUMENTS

JP 2005-309012 A 11/2005
JP 2007-114464 A 5/2007
JP 2007-318445 A 12/2007

OTHER PUBLICATIONS

International Search Report of PCT/JP2010/059461, mailing date Jul. 20, 2010.
Kwiat, Paul et al., "New High-Intensity Source of Polarization-Entangled Photon Pairs", Physical Review Letters, Dec. 1995, pp. 4337-4342, vol. 75 cited in spec.
Lim, Han Chuen et al., "Stable source of high-quality telecom-band polarization-entangled photon-pairs based on a single, pulse-pumped, short PPLN waveguide", Optics Express, Aug. 2008, pp. 12460-12468, vol. 16 cited in spec.

(Continued)

*Primary Examiner* — Hemang Sanghavi
(74) *Attorney, Agent, or Firm* — Westerman, Hattori, Daniels & Adrian, LLP

(57) ABSTRACT

A wavelength-multiplexed polarization entangled photon pair generator (1) includes: a pump light source (2); a polarization entangled photon pair generating body (4) on which pump light (3) outputted from the pump light source (2) falls; and a spectrometer (7) on which a wavelength-multiplexed parametric photon pair (5) outputted from the polarization entangled photon pair generating body 4 falls. The polarization entangled photon pair generating body (4) made of a nonlinear optical crystal (11) generates wavelength-multiplexed photon pairs by subjecting the pump light 3 to type II phase matching. As a nonlinear optical crystal 11, lithium tantalate of periodically poled structure (11A) can be used, and as a spectrometer (7), an arrayed-waveguide grating can be used. Wavelength-multiplexed polarization entangled photon pairs (5) can thus be generated with simple equipment.

10 Claims, 10 Drawing Sheets

OTHER PUBLICATIONS

Lim, Han Chuen et al., "Wavelength-multiplexed distribution of highly entangled photon-pairs over optical fiber", Optics Express, Dec. 2008, pp. 22099-22104, vol. 16 cited in ISR.

NASR, Magued et al., "Ultrabroadband Biphotons Generated via Chirped Quasi-Phase-Matched Optical Parametric Down-Conversion", Physical Review Letters, May 2008, pp. 183601-1-183601-4, vol. 100 cited in ISR & spec.

Pelton, Matthew, "Bright, single-spatial-mode source of frequency non-degenerate, polarization-entangled photon pairs using periodically poled KTP", Optics Express, Jul. 2004, pp. 3573-3580, vol. 12 cited in spec.

Shimizu, Ryosuke et al., "Generation of entangled photon pairs using a PPKTP device with a group-velocity-matching condition", pp. 141.

Shimizu, Ryosuke, "High-flux and broadband biphoton sources with controlled frequency entanglement", Optics Express, Sep. 2009, pp. 16385-16393, vol. 17 cited in ISR.

Takesue, Hiroki et al., "Generation of polarization-entangled photon pairs and violation of Bell's inequality using spontaneous four-wave mixing in a fiber loop", Physical Review, 2004, pp. 031802-1-031802-4, vol. 70 cited in spec.

Lee, P.S.K. et al., "Increased polarization-entangled photon flux via thinner crystals", Physical Review A, Oct. 2004, pp. 042818-1-043818-4, vol. 70 cited in spec.

Suzuki Hiroshi et at., "Generation of polarization entangled photon pairs using PPLN under the type-II phase matching condition", Abstracts of the Meeting of the Physical Society of Japan, Aug. 25, 2008, vol. 63, No. 2,141 cited in ISR included on same sheet with NPL Documents No. 7 (Shimizu, Ryosuke et al., Generation of entangled . . . ).

\* cited by examiner

US 8,488,231 B2

GENERATOR OF POLARIZATION ENTANGLED PHOTON PAIRS AND METHOD OF GENERATING THE SAME

TECHNICAL FIELD

The present invention relates to a generator of polarization entangled photon pairs and a method of generating the same. More specifically, the present invention relates to a generator of polarization entangled photon pairs capable of multiplexing wavelengths and a method of generating the same.

BACKGROUND ART

With significant progress of information and communication technologies in recent years involving electronic trading and e-mail, cryptographic technologies applicable to transmission of information have been studied vigorously. As one of such cryptographic technologies, quantum cryptography is drawing attention.

The safety of quantum cryptography is ensured by physical phenomena according to Heisenberg's uncertainty principle in quantum mechanics. According to the uncertainty principle, since quantum state changes by the eavesdropping of communication, namely observation, becomes apparent without fail, and necessary measures including interruption of communication can be implemented accordingly. The eavesdropping is therefore regarded physically impossible. Reproduction of particles is also deemed impossible according to the uncertainty principle.

Quantum teleportation is a major element of quantum cryptography. Quantum teleportation is a technique of transporting quantum information of particles only to other places. Quantum teleportation is achieved by allowing photons to exchange information using quantum entanglement. A photon pair has characteristics that once the quantum state of one of the pair in an entangled state is determined, the quantum state of the other is also determined. The characteristics do not depend on the distance between two photons.

With the quantum teleportation technology described above, a pair of photons in a state of quantum entanglement is absolute imperative. Various methods of generating photon pairs in a state of quantum entanglement are known. For example, Patent Reference 1 discloses irradiating two parent photons to a semiconducting material to generate an exciton molecule whose angular momentum is 0 by two-photon resonant excitation, and simultaneously splitting the generated exciton molecule into two photons, thus generating a photon pair in a state of quantum entanglement.

Quantum entanglement achieved by polarized light of two photons is also used. As a state of quantum entanglement of two quantum bits (two photons) using polarized light, four conditions expressed by the following equations (1) and (2) are known.

$$|\Psi^{\pm}\rangle_{12} \equiv \frac{1}{\sqrt{2}}(|H\rangle_1|V\rangle_2 \pm |V\rangle_1|H\rangle_2) \quad (1)$$

$$|\Phi^{\pm}\rangle_{12} \equiv \frac{1}{\sqrt{2}}(|H\rangle_1|H\rangle_2 \pm |V\rangle_1|V\rangle_2) \quad (2)$$

where, $|H\rangle_i$ represents that a photon having a first polarized light (H) exists in mode i (i: 1 or 2), and $|V\rangle_{i'}$ represents that a photon having a second polarized light (V) exists in mode i' (i': 1 or 2). As physical quantity determining the modes of photons i, i', optical paths and angular frequency of photons are considered.

(Method of Generating a Two-Photon State Using Parametric Down-Conversion)

As a physical process of generating a two-photon state, process of spontaneous parametric down-conversion is used frequently. In the process of spontaneous parametric down-conversion, a pumping photon having an angular frequency $\omega_p$ and wave vector $k_p$ that has entered a nonlinear optical crystal is converted at a certain probability into a photon pair of signal photon having angular frequency $\omega_s$ and wave vector $k_s$ and idler photon having angular frequency $\omega_i$ and wave vector $k_i$. In this case, as phase matching conditions for causing the process of spontaneous parametric down-conversion to occur, the angular frequency condition shown by equation (3) and the momentum conversation law shown by equation (4) must be satisfied at the same time. The angular frequency condition is also called the energy conservation law.

$$\omega_p = \omega_s + \omega_i \quad (3)$$

$$k_p = k_s + k_i \quad (4)$$

Phase matching conditions are classified into the following three types depending on the polarized light of each photon:

(a) Type 0 Phase Matching Condition

The case where a pumping photon, signal photon, and idler photon have the same polarized light is called type 0 phase matching condition.

(b) Type I Phase Matching Condition

The case where a signal photon and idler photon have the same polarized light, and a pumping photon has a polarization state orthogonal to the signal and idler photons, is called type I phase matching condition.

(c) Type II Phase Matching Condition

The case where the polarized light of a signal photon and that of an idler photon cross orthogonal to each other, and a pumping photon has the polarized light of one of the above-mentioned photons is called type II phase matching condition.

(Method of Achieving High Degree of Polarization Entanglement Using a Wavelength Band-Limiting Filter)

A signal photon and an idler photon generated by the process of spontaneous parametric down-conversion have broadband wavelength spectra. Generally, if a signal photon and an idler photon having broadband wavelength spectra are used, the coherence time of two photons may decrease, thus deteriorating polarization entanglement. To increase the degree of polarization entanglement of generated photon pairs, a method of limiting the spectra of idler photons using a wavelength band-limiting filter is available. An interference filter having a dielectric multilayer structure is generally used to limit wavelength band. This type of interference filter can pass light having a given center wavelength and band width based on structural design, but the wavelength band allowed to be passed at a time is limited to one kind of band. Consequently, conventional methods have focused mainly on generating narrowband parametric photon pairs.

Assuming the speed of light in vacuum as c, the angular frequency $\omega$ and wavelength $\lambda$ of a photon are expressed by equation (5) as shown below. If the angular frequency $\omega$ of the photon is defined, the wavelength $\lambda$ can be found using the following equation. Therefore, the angular frequency and the wavelength are used as approximately the same meaning because angular frequency is easy to handle theoretically, and wavelength is easy to handle experimentally.

$$\omega = 2\pi c/\lambda \quad (5)$$

(Conventional Method of Generating a State of Polarization Entanglement)

Some methods of generating a state of polarization entanglement where two photons have the same angular frequency have been reported (Non-Patent Reference 1, for example). With the method disclosed in Non-Patent Reference 1, since the angular frequency of two photons is indistinguishable from each other, the mode is determined by the optical paths of the photons. Namely, the two photons must be emitted into different optical paths.

Meanwhile, a method of generating a state of polarization entanglement where two photons have different angular frequencies has also been proposed. With this method, since the mode of a photon is distinguished from that of the other by their angular frequencies, the two photons can exist on the same optical path.

As a method of generating a state of polarization entanglement where two photons have different angular frequencies, Non-Patent Reference 2 discloses a method of using type 0 or type I parametric down-conversion. Non-Patent Reference 2 generates a photon pair by placing nonlinear optical crystals in series, rotating by 90 degrees from each other, so that type 0 or type I phase matching conditions for generating two photons having the same polarized light state are satisfied. In this case, light from the same pump light source is irradiated to two crystals, and thus two photons ($\omega_1$, $\omega_2$) having different angular frequencies are generated in the coaxial direction of the pump light. However, this method involves complexity that two crystals having the same characteristics must be provided and arranged accurately.

Non-Patent Reference 4 discloses a method of using type 0 or type I parametric down-conversion and an interferometer. This method generates a photon pair by placing a nonlinear optical crystal in an interferometer so that type 0 or type I phase matching conditions for generating two photons having the same polarized light state are satisfied. However, since this method uses an interferometer, equipment structure becomes complicated.

Non-Patent Reference 5 discloses generation of photon pairs under type 0 phase matching condition.

Patent Reference 2 discloses a method of creating two types of periodically poled structures in a single crystal. Since this method uses different phase matching conditions, namely types 0 and I, it is difficult to balance the generation efficiency of two photons generated in each periodically poled structure that satisfy each phase matching condition, which is a disadvantage. Poor balance in generation efficiency of two photons generated in each periodically poled structure results in decrease in the degree of quantum entanglement.

Non-Patent Reference 3 discloses a method using a four optical wave mixing process, namely a third order nonlinear optical phenomenon that occurs in optical fibers. With this method, since optical fibers must be installed within an interferometer to generate a state of polarization entanglement, equipment configuration becomes complicated.

PRIOR TECHNICAL REFERENCE

Patent Reference

Patent Reference 1: JP2005-309012 A
Patent Reference 2: JP2007-114464 A

Non-Patent Reference

Non-Patent Reference 1: P. G. Kwiat et al., "New high-intensity source of polarization-entangled photon pairs," Phys. Rev. Lett., Vol. 75, 4337, 1995

Non-Patent Reference 2: M. Pelton et al., "Bright, single-spatial-mode source of frequency non-degenerate, polarization-entangled photon pairs using periodically poled KTP," Opt. Express, Vol. 12, 3573, 2004

Non-Patent Reference 3: H. Takesue and Kyo Inoue, "Generation of polarization-entangled photon pairs and violation of Bell's inequality using spontaneous four-wave mixing in a fiber loop," Phys. Rev., Vol. A 70, 031802, 2004

Non-Patent Reference 4: H. C. Lim, A. Yoshizawa, H. Tsuchida, and K. Kikuchi, "Stable source of high quality telecom-band polarization-entangled photon pairs based on a single, pulse-pumped, short PPLN waveguide," Opt. Express, Vol. 16, 12460, 2008

Non-Patent Reference 5: M. B. Nasr, S. Carrasco, B. E. A Saleh, A. V. Sergienko, M. C. Teich, J. P. Torres, L. Torner, D. S. Hum, and M. M. Fejer, "Ultrabroadband biphotons generated via chirped quasi-phase matched optical parametric down-conversion," Phys. Rev. Lett. Vol. 100, p. 183601, 2008

SUMMARY OF INVENTION

Problems to be Solved by the Invention

With conventional methods of generating polarization entangled photon pairs, since narrowband parametric photon pairs are used, the spectral range of parametric photon pairs is limited by using a transmission passband filter having a given center frequency. An interference filter having a dielectric multilayer structure can pass light having given center wavelength and bandwidth, but the transmissible wavelength band is limited to only one type. Consequently, parametric fluorescence falling outside the transmission passband is blocked by the filter, and it has not been used to generate polarization entangled photons.

In view of the problems described above, the purpose of the present invention is to provide a generator of polarization entangled photon pairs capable of multiplexing wavelengths by using parametric photon pairs that have been caught by a filter and thus have not been used, and a method of generating the same.

Means for Solving the Problems

To achieve the above objective, a generator of wavelength-multiplexed polarization entangled photon pairs includes a pump light source, a polarization entangled photon pair generating body on which pump light outgoing from the pump light source falls, and a spectrometer on which a parametric photon pair outgoing from the photon pair generating body and having been subjected to wavelength multiplexing falls, wherein the polarization entangled photon pair generating body is made of a nonlinear optical crystal, and that wavelength-multiplexed polarization entangled photon pairs are generated by type II phase matching of the pump light.

In the above structure, the nonlinear optical crystal preferably has a periodically poled structure. The polarization reversal period of the periodically poled structure preferably has a linear chirp structure that gradually changes in the direction of the optical axis of the nonlinear optical crystal. The nonlinear optical crystal is preferably made of lithium tantalate. The spectrometer is preferably made of an arrayed-waveguide grating.

According to the above structure, by using a simple light source having a pump light source and a polarization entangled photon pair generating body made of a nonlinear crystal, wavelength-multiplexed polarization entangled photon pairs can be generated easily.

The method of generating wavelength-multiplexed polarization entangled photon pairs according to the present invention includes: forming a polarization entangled photon pair generating body made of a nonlinear optical crystal; irradiating a pump light having angular frequency of $\omega_p$ to the polarization entangled photon pair generating body; conducting type II phase matching between the pump light and signal/idler light generated within the polarization entangled photon pair generating body, thereby generating a photon pair whose polarized light crosses orthogonal to each other and whose wavelengths are multiplexed; branching the wavelength-multiplexed polarization entangled photon pair so that angular frequency becomes $\omega_0, \omega_1, \omega_2, \ldots \omega_{n-2}, \omega_{n-1}, \omega_n$; and establishing an angular frequency relation of the wavelength-multiplexed polarization entangled photon pair so that the energy conservation law expressed by equation (6) shown below is satisfied.

$$\begin{aligned} \omega_p &= \omega_0 + \omega_n \\ &= \omega_1 + \omega_{n-1} \\ &= \omega_2 + \omega_{n-2} \\ &\vdots \end{aligned} \quad (6)$$

In the above structure, forming a periodically poled structure having a period of $\Lambda$ in the direction of optical axis of the pump light in the nonlinear optical crystal, making the period $\Lambda$ to satisfy equation (7) shown below, and conducting a quasi-phase matching between the pump light and the signal/idler light generated within the polarization entangled photon pair generating body.

$$k_p = k_s + k_i + 2\pi/\Lambda \quad (7)$$

where, $k_p$, $k_s$, and $k_i$ respectively represent wave number vector of the pump light having entered the nonlinear optical crystal, wave number vector of the signal light generated within the nonlinear optical crystal, and wave number vector of the idler light generated within the nonlinear optical crystal.

The nonlinear optical crystal may be replaced by lithium tantalate. Branching may be performed using an arrayed-waveguide grating.

Effects of the Invention

According to the wavelength-multiplexed polarization entangled photon pair generator and the method of generating the same of the present invention, wavelength-multiplexed polarization entangled photon pairs can be generated using simple equipment, and the amount of information in quantum information and communication technologies can be increased.

DESCRIPTION OF CODES

Figure 1:
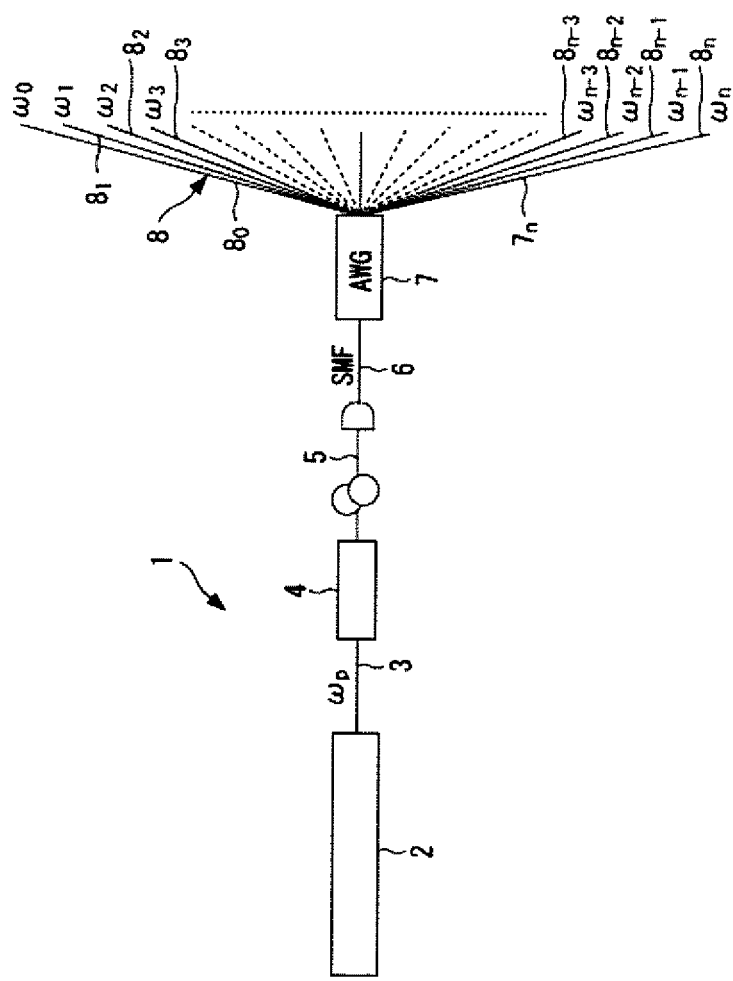
FIG. 1 is a chart illustrating a wavelength-multiplexed polarization entangled photon pair generator of the present invention.

| | |
|---|---|
| 1: | Wavelength-multiplexed polarization entangled photon pair generator |
| 2: | Pump light source |
| 3: | Pump light outgoing from the pump light source |
| 4: | Wavelength-multiplexed polarization entangled photon pair generating body |
| 5: | Wavelength-multiplexed parametric photon pair |
| 6: | First optical fiber |
| 7: | Arrayed-waveguide grating |
| 8: | Second optical fiber |
| 11: | Nonlinear optical crystal |
| 11A: | Periodically poled structure |
| 12: | Variation of nonlinear optical crystal |
| 12A: | Periodically poled structure |
| 15: | Semiconductor substrate |
| 16: | Insulating film |
| 17: | Input waveguide |
| 18: | First lens waveguide |
| 19: | Arrayed waveguide |
| 21: | Second lens waveguide |
| 22: | Output waveguide |

MODES FOR CARRYING OUT THE INVENTION

The embodiment of the present invention will hereinafter be described in detail by referring to the drawings.

FIG. 1 illustrates the structure of a wavelength-multiplexed polarization entangled photon pair generator 1 of the present invention. As shown in FIG. 1, the wavelength-multiplexed polarization entangled photon pair generator 1 of the present invention includes a pump light source 2, wavelength-multiplexed polarization entangled photon pair generating body 4 on which pump light 3 outgoing from the pump light source 2 falls, a first optical fiber 6 on which the light outgoing from the wavelength-multiplexed polarization entangled photon pair generating body 4 falls, a spectrometer 7 connected to the first optical fiber 6, and a second optical fiber 8 connected to the spectrometer 7. A wavelength-multiplexed parametric photon pair 5 outgoing from the polarization entangled photon pair generating body 4 enters the first optical fiber 6.

In this case, a light collecting means such as lenses may be placed between the polarization entangled photon pair generating body 4 and the first optical fiber 6.

(Pump Light Source 2)

The pump light source 2 is a laser generating pump light 3. The angular frequency of the pump light 3 is assumed to be $\omega_p$. The polarized light of the pump light 3 is made to be a linear polarized light by a light polarizer, etc. not shown.

(Polarization Entangled Photon Pair Generating Body 4)

The polarization entangled photon pair generating body 4 is made of a nonlinear optical crystal. When pump light 3 having angular frequency of $\omega_p$ enters a nonlinear optical crystal, two photons whose polarized light is made to cross orthogonal to each other due to the process of spontaneous parametric down-conversion are generated. The two photons thus generated have broadband spectra. In this case, to generate two photons whose polarized light is made to cross orthogonal to each other by the nonlinear optical crystal, type II phase matching conditions are used. The polarization state obtained under type II phase matching conditions is expressed as oeo or eoo, where o represents an ordinary ray, and e represents an extraordinary ray. These codes exhibit polarization of light contributing to the parametric process, in order of idler photon, signal photon, and pump light, namely oeo represents that the polarized light of the idler photon and that of the pump light 3 are ordinary rays and the polarized light of signal photon is an extraordinary ray. Similarly, eoo represents that the polarized light of signal photon and that of the pump light 3 are ordinary rays and the polarized light of idler photon is an extraordinary ray.

(Quasi Phase Matching Method of Nonlinear Optical Crystal)

As a method satisfying type II phase matching conditions for a given wavelength, a quasi phase matching method is known. The quasi phase matching method satisfies phase matching conditions by periodically modulating the second-order nonlinear susceptibility of a nonlinear optical crystal 11. As a periodic second-order linear susceptibility modulating method, so-called periodic poling method of periodically reversing intrinsic polarization of nonlinear optical crystals can be used.

(Nonlinear Optical Crystal made to have a Periodically Poled Structure)

Figure 2:
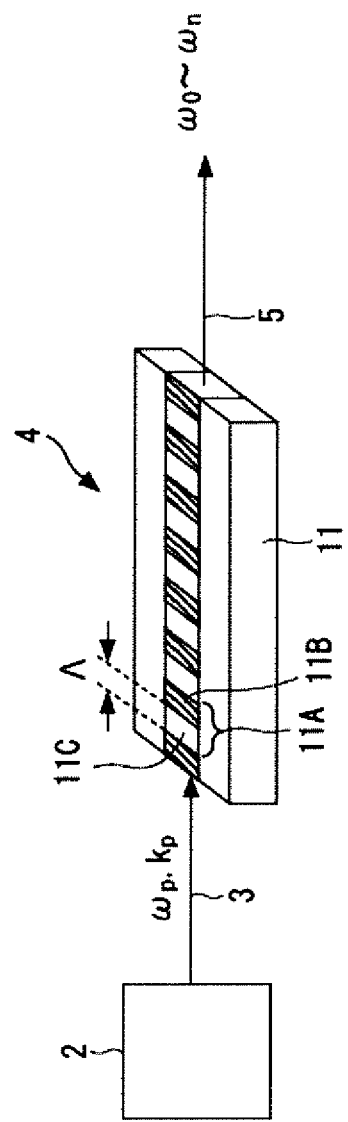
FIG. 2 is a chart illustrating the relation between a pump light source and a polarization entangled photon pair generating body.

FIG. 2 illustrates the relation between a pump light source 2 and polarization entangled photon pair generating body 4. As shown in FIG. 2, the polarization entangled photon generating body 4 is made of a nonlinear optical crystal 11, which has a periodically poled structure 11A having a period of Λ. In period Λ, the polarization of region 11B shown in diagonal lines and the polarization of the adjacent region 11A are reversed, forming an alternating polarization state.

To form a periodically poled structure 11A in the nonlinear optical crystal 11, a intrinsically polarized nonlinear optical crystal 11 is provided, and region 11B shown by diagonal lines is made to have polarity opposite to the intrinsic polarization. For example, a common electrode is formed in the region 11B shown by diagonal lines on the surface of the nonlinear optical crystal 11, and a backside electrode is formed on the rear face of the nonlinear optical crystal 11. After polarization is performed by applying voltage between the common electrode and the backside electrode in the direction reverse to the intrinsic polarization, the common electrode and the backside electrode are removed to form a polarization entangled photon pair generating body 4 made of a nonlinear optical crystal 11.

The energy conservation law applicable to polarization entangled photon pair generating body 4 having a periodically poled structure 11A is expressed by equation (7) as shown below, which is a variation of equation (4).

$$k_p = k_s + k_i + 2\pi/\Lambda \quad (7)$$

where, $k_p$ represents a wave vector of the pump light 3 having entered the nonlinear optical crystal 11, $k_s$ represents the wave vector of the signal light generated within the nonlinear optical crystal 11, $k_i$ represents the wave vector of the idler light generated within the nonlinear optical crystal 11, and Λ represents the modulation period of the second-order nonlinear susceptibility of the nonlinear optical crystal 11.

In the polarization entangled photon pair generating body 4, as a result of incidence of pump light having angular frequency of $\omega_p$ and wave vector of $k_p$, a plurality of photon pairs whose polarized light crosses orthogonal to each other are generated coaxially with the direction of the advancement of pump light 3 (referred to as collinear alignment). The polarization reversal period Λ of the nonlinear optical crystal 11 is adjusted to satisfy equation (7) and the energy conservation law expressed by equation (8), which will be described later.

To generate a parametric photon pair 5 having broadband wavelength distribution using multimode property of light, it is necessary to use a thin nonlinear optical crystal 11, thus decreasing the length of interaction in general. However, if the length of interaction decreases, the generation efficiency the parametric photon pair 5 also decreases. The polarization entangled photon pair generating body 4 of the present invention can use a nonlinear optical crystal 11 made to have a periodically poled structure 11A capable of generating a parametric photon pair 5 having broadband wavelength band distribution even if the length of interaction is long. As a material of such nonlinear optical crystal 11, lithium tantalate ($LiTaO_3$), etc. can be used.

(Variation of a Nonlinear Optical Crystal made to have a Periodically Poled Structure)

As a method of increasing the length of interaction while widening the spectrum band in type II spontaneous parametric down-conversion, the polarization reversal period can be changed gradually.

Figure 3:
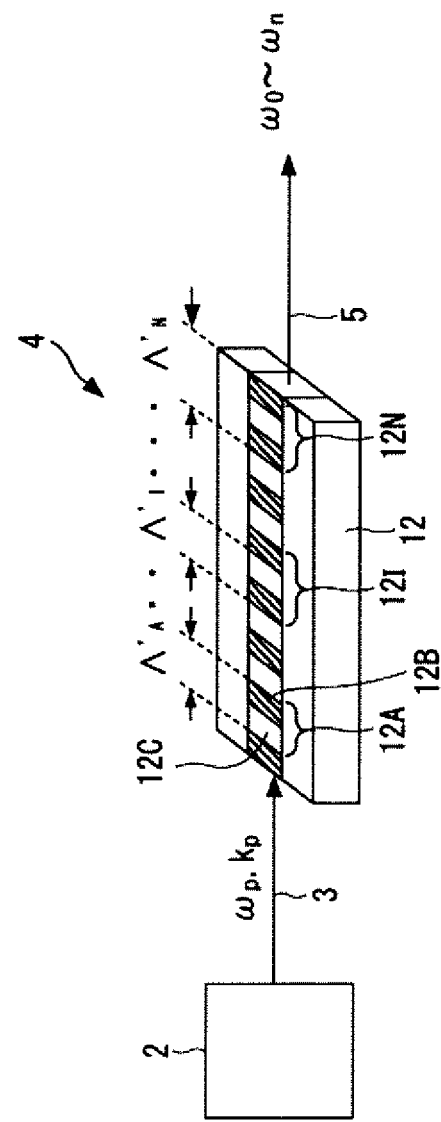
FIG. 3 is a perspective view of the structure of a variation of a nonlinear optical crystal.

FIG. 3 is a perspective view illustrating the structure of a variation 12 of the nonlinear optical crystal.

As shown in FIG. 3, the polarization reversal period Λ' of the periodically poled structure 12A of variation 12 of the nonlinear optical crystal is structured to change gradually and linearly from left to right of the variation 12 of the nonlinear optical crystal as follows: $\Lambda'_A \ldots \Lambda'_I \ldots \Lambda'_N$. Such periodically poled structure 12A is also called a linear chirp structure. In this case, the polarization reversal period Λ' of the periodically poled structure of the variation 12 of nonlinear optical crystal is adjusted to satisfy the momentum conservation law expressed by equation (7) and the energy conservation law expressed by equation (8), which will be described later.

The polarization reversal period Λ' gradually changes in the direction of the optical axis. Consequently, the center wavelength of the signal photon and the idler photon can be determined by adjusting the wavelength of the pumping photon and rough average value Λ'av of the polarization reversal period Λ'. Furthermore, the bandwidth of the signal photon and the idler photon can be adjusted by allowing the difference in the period at both ends of the variation 12 of nonlinear optical crystal ($|\Lambda'_A - \Lambda'_N|$) to become a specified value.

Since the polarization reversal period Λ' of the variation 12 of the nonlinear optical crystal has a gradually changing linear chirp structure, type II phase matching of the pump light is allowed, and photon pair generation bandwidth can thus be increased. Consequently, the variation 12 of nonlinear optical crystal can be used as a polarization entangled photon pair generating body 4 for generating wavelength-multiplexed polarization entangled photon pairs. As materials for nonlinear optical crystal 12, lithium tantalate, lithium niobate (LiNbO$_3$), and potassium titanyl phosphate (KTiOPO$_4$) can be used.

(First Optical Fiber 6)

A first optical fiber 6 transmits wavelength-multiplexed parametric photon pairs 5 generated in the polarization entangled photon pair generating body 4 to the arrayed-waveguide grating 7.

(Arrayed-Waveguide Grating 7)

Figure 4:
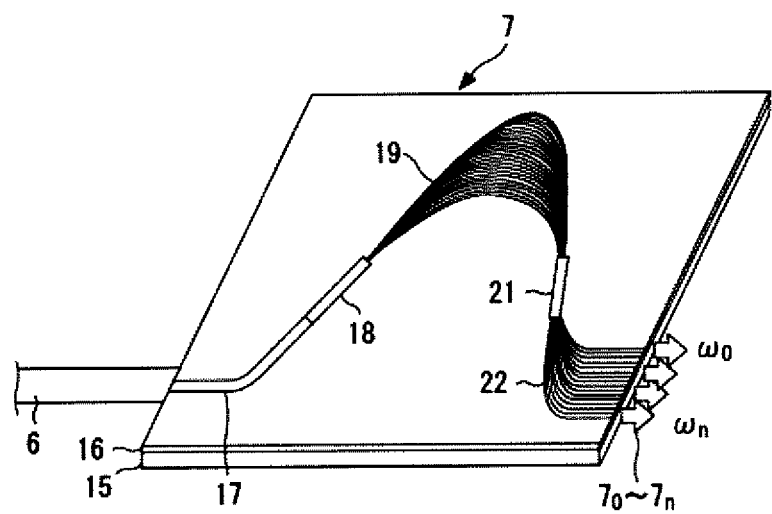
FIG. 4 is a perspective view illustrating the structure of an arrayed-waveguide grating.

FIG. 4 is a perspective view illustrating the structure of an arrayed-waveguide grating as a typical spectrometer 7. The arrayed-waveguide grating 7 is abbreviated as AWG. As shown in FIG. 4, the arrayed-waveguide grating 7 includes an input waveguide 17 formed within an insulating film 16 formed on a semiconductor substrate 15 made of Si, etc., a first lens waveguide 18 connected to the input waveguide 17, an arrayed-waveguide 19 connected to the output terminal of the first lens waveguide 18, a second lens waveguide 21 connected to the output terminal of the arrayed-waveguide 19, and an output waveguide 22 connected to the output terminal of the second lens waveguide 21. In this case, the first fiber 6 may be structured by bundling the same number of optical fibers as incident waveguides.

Figure 5:
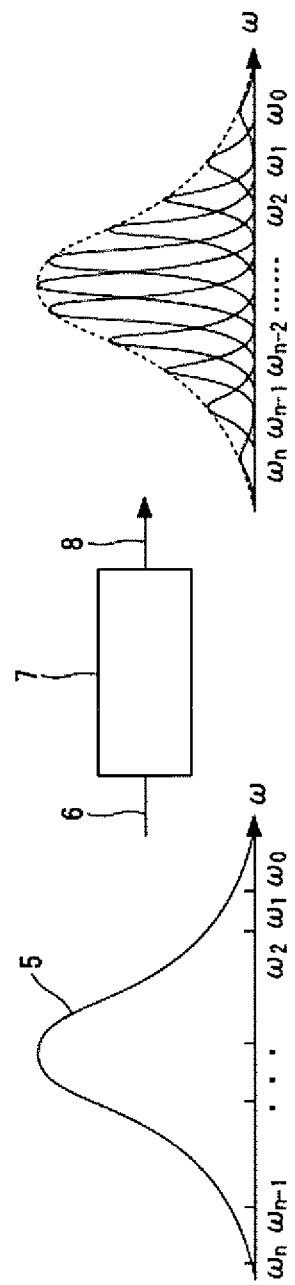
FIG. 5 is a chart illustrating the branching of light made up of wavelength-multiplexed parametric photon pairs generated by a polarization entangled photon pair generating body by an arrayed-waveguide grating.

FIG. 5 illustrates a process where light made up of wavelength-multiplexed parametric photon pairs 5 generated in the polarization entangled photon pair generating body 4 is branched in the arrayed-waveguide grating 7. In the arrayed-waveguide grating 7, the wavelength-multiplexed light 5 outgoing from the first optical fiber 6 enters the arrayed-waveguide 19 having the function of triangular prism via the first lens waveguide 18, the light branched by wavelength is irradiated from the output waveguide 22, and the light branched by wavelength is introduced to each of the second optical fiber 8 ($8_0$ to $8_n$).

(Second Optical Fiber 8)

The second optical fiber 8 is connected to the output waveguide 22 of the arrayed-waveguide grating 7. When the arrayed-waveguide grating 7 is equipped with output waveguides of the quantity expressed as n+1, the second optical fiber $8_0$ to $8_n$ is connected to each of the output waveguides of the quantity expressed as n+1. The quantity of the second optical fibers 8 is expressed as n+1, and the center angle frequency of the second optical fiber 8 is expressed as $\omega_0, \omega_1, \omega_2, \ldots \omega_{n-2}, \omega_{n-1}, \omega_n$.

The operation of the wavelength-multiplexed polarization entangled photon pair generator 1 of the present invention will hereinafter be described.

As described above, in the process of spontaneous parametric down-conversion in the polarization entangled photon pair generating body 4, polarized light of a photon pair crosses orthogonal to each other is generated to satisfy the energy conservation law. Consequently, as shown by the following equation (8), two photons forming the parametric photon pair 5 are introduced to given fiber channels 1 and m. At this time, the angular frequency conditions satisfying the energy conservation law are expressed by equation (8) as shown below. Two photons forming the parametric photon pair 5 are introduced to given fiber channels 1 and m.

$$\omega_p = \omega_l + \omega_m \quad (8)$$

The polarized light of the two photons crosses orthogonal to each other. However, since the arrayed-waveguide grating 7 does not split photons by polarization, the polarization state of the photons output to the optical fiber channel 8 on the output side is not determined. In other words, the two photons output from the two optical fiber channels satisfying the energy conservation law form a state of polarization entanglement shown by equation (9) as shown below.

$$|\psi\rangle = \frac{1}{\sqrt{2}}(|H\rangle_{\omega_l}|V\rangle_{\omega_m} + |V\rangle_{\omega_l}|H\rangle_{\omega_m}) \quad (9)$$

In the above equation, $|H\rangle_{\omega i}$ (i: l or m) exhibits that the photon having a first polarized light (H) has an angular frequency of $\omega_i$, and that the frequency is $\omega_l$ or $\omega_m$. $|V\rangle_{\omega i}$ (i: l or m) exhibits that the photon having a second polarized light (V) has an angular frequency of $\omega_i$, and that the angular frequency is $\omega_l$ or $\omega_m$.

Equation (9) as shown above demonstrates that the physical quantity to determine the mode i of photons is angular frequency of the photons. The orientations of the first polarized light (H) and that of the second polarized light (V) cross orthogonally to each other. In other words, the state of polarization entanglement expressed by equation (9) represents the state of polarization entanglement using frequency modes.

Next, assume that the center angle frequency of each optical fiber channel satisfies equation (6) as shown below.

$$\begin{aligned}\omega_p &= \omega_0 + \omega_n \\ &= \omega_1 + \omega_{n-1} \\ &= \omega_2 + \omega_{n-2} \\ &\vdots\end{aligned} \quad (6)$$

In this case, two photons satisfying the energy conservation law, a pair having angular frequencies of $\omega_0$ and $\omega_n$ as shown in FIG. 1 for example, form the state of polarization entanglement expressed by equation (10) as shown below. A photon pair having angular frequencies $\omega_0, \omega_n$ is made to enter respective optical fiber channels $8_0, 8_n$.

$$\begin{aligned}|\psi\rangle_{0,n} &= \frac{1}{\sqrt{2}}(|H\rangle_{\omega_0}|V\rangle_{\omega_n} + |V\rangle_{\omega_0}|H\rangle_{\omega_n}), \\ |\psi\rangle_{1,n-1} &= \frac{1}{\sqrt{2}}(|H\rangle_{\omega_1}|V\rangle_{\omega_{n-1}} + |V\rangle_{\omega_1}|H\rangle_{\omega_{n-1}}), \\ |\psi\rangle_{2,n-2} &= \frac{1}{\sqrt{2}}(|H\rangle_{\omega_2}|V\rangle_{\omega_{n-2}} + |V\rangle_{\omega_2}|H\rangle_{\omega_{n-2}}), \\ &\vdots\end{aligned} \quad (10)$$

For example, $|H\rangle_{\omega i}$ (i: 0 or n) in the first equation of equation (10) demonstrates that the photon having a first polarized light (H) has an angular frequency of $\omega_i$, and that the angular frequency is $\omega_0$ or $\omega_n$. $|V\rangle_{\omega i}$ (i: 0 or n) demonstrates that the photon having a second polarized light (V) has an angular frequency of $\omega_i$, and that the angular frequency is $\omega_0$ or $\omega_n$.

(Typical Design of Wavelength-Multiplexed Polarization Entangled Photon Pair Generator 1)

Using the polarization entangled photon pair generating body 4, calculation was conducted to achieve type II phase matching of pump light 3. Specifically, the periodically poled structure 11A formed in nonlinear optical crystal 11 was calculated.

Lithium tantalate (LiTaO$_3$) and lithium niobate (LiNbO$_3$) were used as the nonlinear optical crystal 11, and calculation of quasi phase matching was conducted using equation (7).

The length of nonlinear optical crystal 11 on the direction of optical axis (also called element length) was defined as 40 mm. When lithium tantalate was used as the nonlinear optical crystal 11 and the wavelength of the pump light 3 was assumed to be 792 nm, the period Λ of the periodically poled structure was found to be 19.4 μm.

Figure 6:
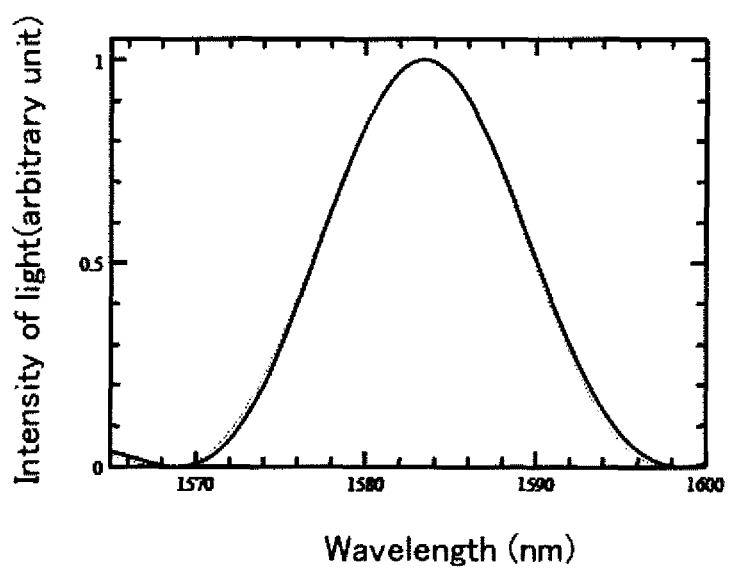
FIG. 6 is a chart illustrating the spectra of parametric photon pairs outgoing from a polarization entangled photon pair generating body made of lithium tantalate.

FIG. 6 shows the calculation result of spectrum of parametric photon pair 5 outgoing from the polarization entangled photon pair generating body 4 made of lithium tantalate. The horizontal axis of FIG. 6 represents wavelength (nm), and the vertical axis represents the intensity of light (arbitrary unit). The length of the polarization entangled photon pair generating body 4 in the direction of optical axis is 40 mm, the period Λ of the periodically poled structure is 19.4 μm, and the wavelength of the pump light 3 is 792 nm.

As shown in FIG. 6, the full width at half maximum of the spectrum of parametric photon pair 5 outputted when pump light 3 having wavelength of 792 nm is made to enter the polarization entangled photon pair generating body 4 made of lithium tantalate is found to be extending to approximately 12.6 nm.

The spectrum shown in FIG. 6 is a calculated spectrum value of the parametric photon pair 5 obtained after the pair has been made to pass an arrayed waveguide grating 7, where the center wavelength is 1584 nm, channel spacing is 0.8 nm, and full width at half maximum of the transmission band per channel is 0.4 nm.

Figure 7:
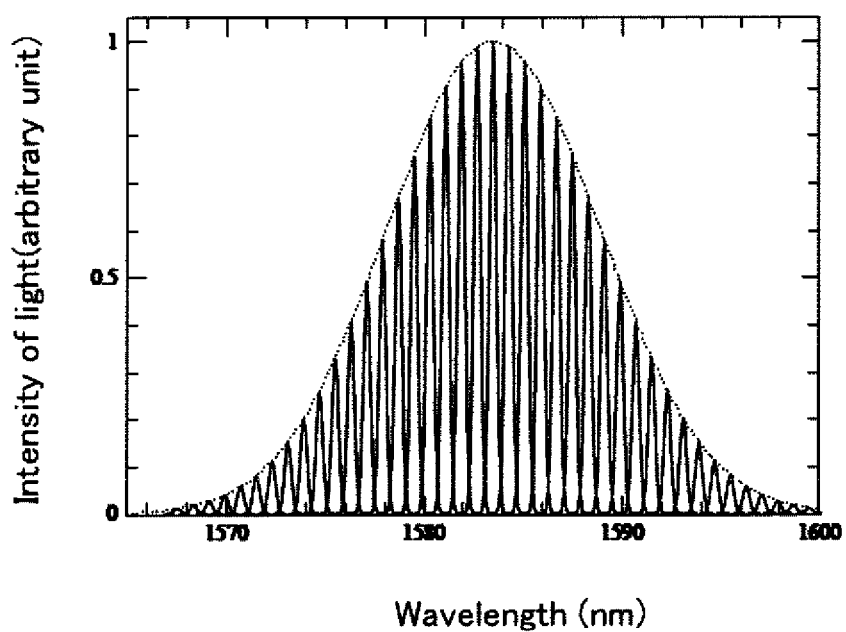
FIG. 7 is a chart illustrating the spectra of the parametric photon pairs shown in FIG. 6 after they have passed the arrayed-waveguide grating.

FIG. 7 is a chart illustrating the spectrum obtained after the parametric photon pair 5 shown in FIG. 6 has been made to pass the arrayed-waveguide grating 7. The horizontal and vertical axes in FIG. 7 represent the same items in FIG. 6.

As shown in FIG. 7, by allowing the parametric photon pair 5 to pass the arrayed-waveguide grating 7, the parametric photon pair 5 is broken down into an approximately 40-channel spectrum. In this case, the two photons outputted to the optical fiber channel 8 having symmetrical wavelength with respect to 1584 nm form a state of polarization entanglement.

COMPARATIVE EXAMPLE

Comparative example using lithium niobate as the nonlinear optical crystal 11 will be described below. The element length in this case is 40 mm. From equation (7), the period Λ of the periodically poled structure was found to be 9.6 μm when the wavelength of pump light 3 was 792 nm.

Figure 8:
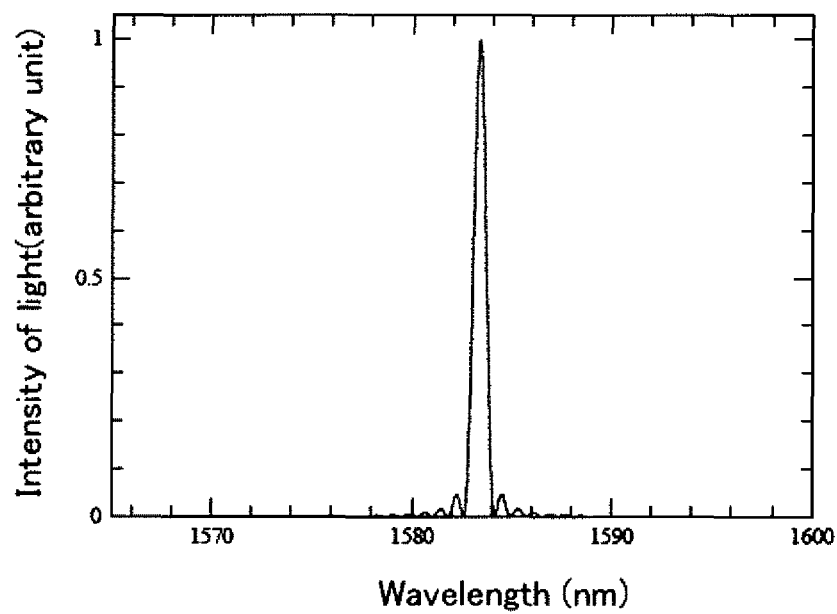
FIG. 8 is a chart illustrating the spectra of parametric photon pairs outgoing from a polarization entangled photon pair generating body made of lithium niobate in comparative example.

FIG. 8 is a chart showing the calculation result of the spectrum of parametric photon pair 5 outputted from the polarization entangled photon pair generating body 4 made of lithium niobate in the comparative example. The horizontal and vertical axes in FIG. 8 represent the same item as FIG. 6.

As shown in FIG. 8, the full width at half maximum of the spectrum of the parametric photon pair 5 outputted when pump light 3 having wavelength of 792 nm is made to enter the polarization entangled photon pair generating body 4 made of lithium niobate is found to be approximately 0.7 nm. With the fact that the channel spacing of a typical arrayed waveguide grating 7 is approximately 0.8 nm (100 GHz) taken into consideration, the polarization entangled photon pair generating body 4 using lithium niobate crystal is found to be inappropriate for wavelength multiplication.

According to the wavelength-multiplexed polarization entangled photon pair generator 1 of the present invention, by irradiating pump light 3 having a single wavelength $\omega_p$ to the wavelength-multiplexed polarization entangled photon pair generating body 4, two photons whose polarized light is made to cross orthogonal to each other by polarization entangled photon pair generating body 4 can be made to have a broadband spectrum. The wavelength of the broadband spectrum consisting of the photon pair has been multiplexed. Only by allowing this broadband spectrum to pass the arrayed-waveguide grating 7, the wavelength-multiplexed polarization entangled photon pair can be branched into a multi-channel spectrum.

The wavelength-multiplexed polarization entangled photon pair generator 1 of the present invention includes a pump light source 2 for generating pump light 3, a wavelength-multiplexed polarization entangled photon pair generating body 4, and an arrayed-waveguide grating 7. The pump light 3 and the wavelength-multiplexed polarization entangled photon pair generating body 4 serve as a two-photon light source for generating a photon pair made up of photons having polarized light crossing orthogonal to each other and broadband spectra. Consequently, unlike conventional methods using combination of two or more crystals or an interferometer, the wavelength-multiplexed polarization entangled photon pair generator 1 of the present invention can achieve a simplified structure and wavelength multiplication of polarization entangled light source at the same time.

Parametric photon pairs 5, which have thus far been blocked by a filter and unused, can also be used as polarization entangled photon pairs, and be applicable to WDM transmission technology.

EXAMPLE 1

The present invention will hereinafter be described further in detail by referring to the example.

A wavelength-multiplexed polarization entangled photon pair generating body 4 was created using lithium tantalate as the nonlinear optical crystal 11. The length of the wavelength-multiplexed polarization entangled photon pair generating body 4 in the direction of the optical axis was set at 40 mm, and a periodically poled structure 11A was formed along the direction of the optical axis. The period Λ of the periodically poled structure was varied, ranging from 18.5 μm through 19.5 μm and 20.5 μm to 21.5 μm.

By irradiating the pump light 3 having the wavelength of 792 nm to the created polarization entangled photon pair generating body 4, the optical spectrum generated from the polarization entangled photon pair generating body 4 was measured. As a light source of the pump light 3, CW-oscillation titanium-sapphire laser whose wavelength was set to 792.0 nm was used.

Figure 9:
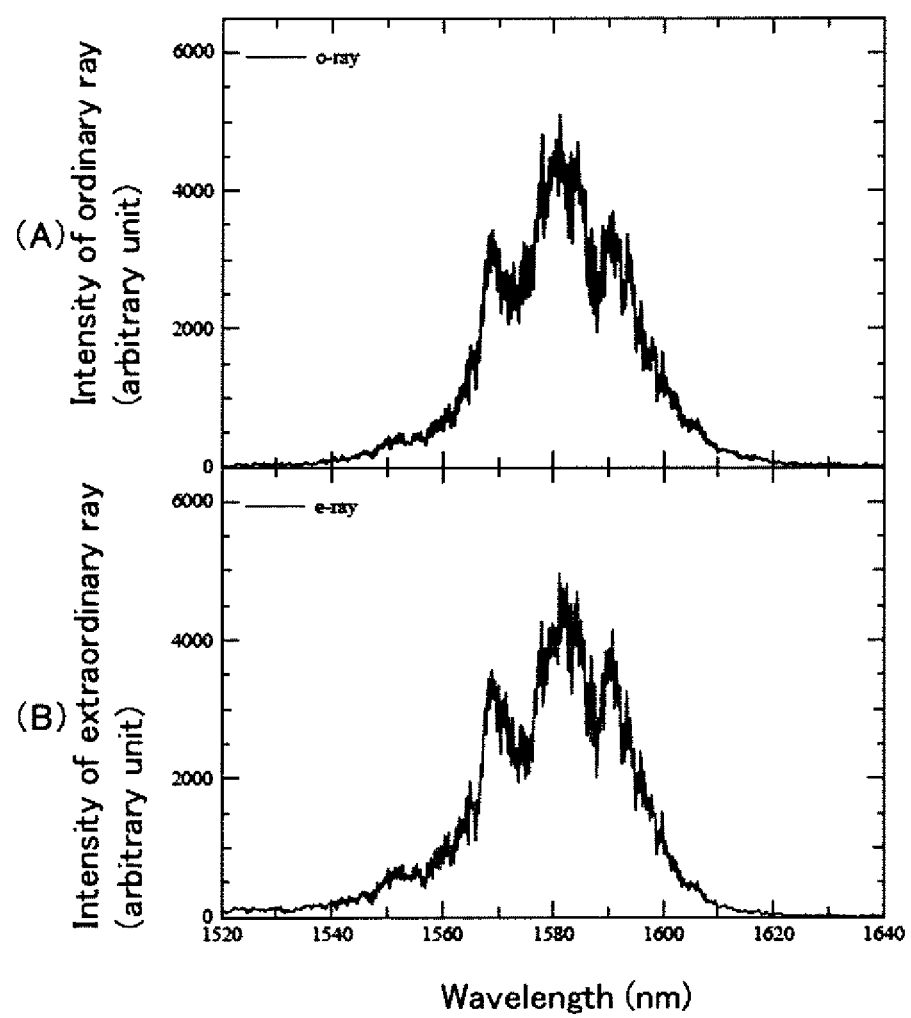
FIG. 9 is a chart illustrating the spectra of parametric photon pairs outgoing from the polarization entangled photon pair generating body made of lithium tantalate in the example, where (A) illustrates those of ordinary light, and (B) illustrates those of extraordinary light.

FIG. 9 is a chart illustrating the spectra of parametric photon pair 5 outputted from the polarization entangled photon pair generating body 4 made of lithium tantalate in the example, where (A) illustrate the spectrum of an ordinary ray, and (B) illustrate that of an extraordinary ray. The horizontal axis of FIG. 9 represents wavelength (nm), and the vertical axis represents the intensity of light (arbitrary unit). The polarization states of the ordinary ray and that of the extraordinary ray cross orthogonally to each other. The period of periodically poled structure of the polarization entangled photon pair generating body 4 was 21.5 μm.

As shown in FIG. 9, the ordinary ray and the extraordinary ray of the parametric photon pair 5 outputted from the polarization entangled photon pair generating body 4 whose periodically poled structure has the period of 21.5 μm exhibit similar intensity with respect to frequency. The observed spectral width of the parametric photon pair 5 was approximately 29 nm in full width at half maximum. It was thus found that a parametric photon pair 5 having a spectral band twice as large as the full width at half maximum of the spectrum predicted from the calculation results shown in FIGS. 6 and 7, namely 12.6 nm, or higher can be generated.

From the above, the parametric photon pair 5 having been made to pass the arrayed-waveguide grating 7, where center wavelength was 1584 nm, channel spacing was 0.8 nm, and full width at half maximum of channel transmission band was 0.4 nm, was found to be broken down to an approximately 80-channel spectrum.

Parametric photon pairs 5 from the polarization entangled photon pair generating body 4 were not observed around the period of the periodically poled structure of 19.4 μm.

The wavelength correlation of the parametric photon pair 5 was then measured.

Figure 10:
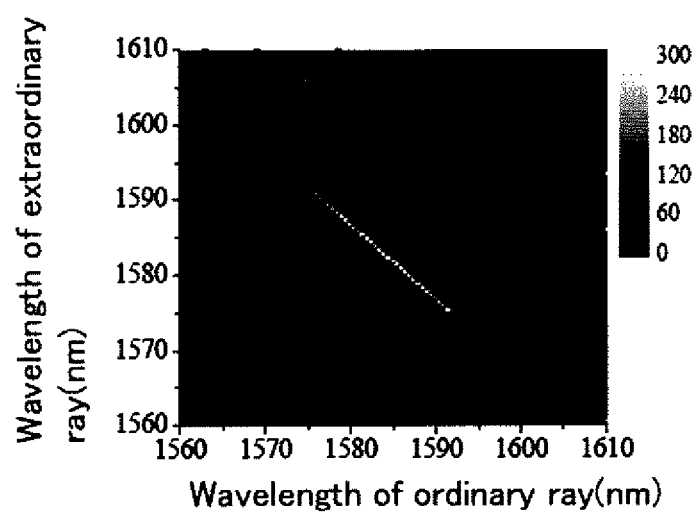
FIG. 10 is a chart illustrating the wavelength correlation of the parametric photon pair shown in FIG. 9.

FIG. 10 is a chart showing the wavelength correlation of the parametric photon pair 5 shown in FIG. 9. The horizontal axis in FIG. 10 represents wavelength (nm) of ordinary rays, and the vertical axis represents the wavelength (nm) of extraordinary rays. The intensity of the photon pair is high in the white area in the chart.

The correlation of the parametric photon pair 5 shown in FIG. 10 indicates that the photon pair is distributed symmetrically with respect to the wavelength of 1584 nm, which is twice the wavelength of the pump light 3, satisfying the energy conservation law.

From the above results, it was confirmed that the photon pair generated using the pump light source 2 and the light source made of a parametric photon pair 5 may be introduced to a 128-channel arrayed-waveguide grating 7, for example, and by conducting wavelength multiplexing, a polarization entangled photon pair can be obtained in 80 channels forming pairs on the output side of the arrayed-waveguide grating 7.

The present invention is not limited to the example described above, but various variations are allowed within the scope described in the claim. It goes without saying that these variations are included in the scope of the present invention. For example, the material, element length, and polarization reversal period Λ, Λ' of the nonlinear optical crystals 11, 12 in the embodiment described above can be adjusted depending on the degree of wavelength multiplication.

What is claimed is:

1. A wavelength-multiplexed polarization entangled photon pair generator, including:
    a pump light source;
    a nonlinear optical crystal on which the pump light output from the pump light source falls; and
    a spectrometer on which a wavelength-multiplexed parametric photon pair output from the nonlinear optical crystal falls, wherein
    the nonlinear optical crystal has a periodically poled structure,
    a type II phase matching is conducted to generate a parametric optical pair whose angular frequency relation satisfies the energy conservation law expressed by equitation (6) shown below and whose polarized light crosses orthogonal to each other, and
    the spectrometer branches the parametric photon pair so that angular frequency becomes $\omega_0, \omega_1, \omega_2, \ldots, \omega_{n-2}, \omega_{n-1}, \omega_n$, thereby generating a wavelength-multiplexed polarization entangled photon pair for each $$\begin{aligned}\omega_p &= \omega_0 + \omega_n \\ &= \omega_1 + \omega_{n-1} \\ &= \omega_2 + \omega_{n-2} \\ &\quad \ldots \ .\end{aligned} \quad (6)$$

2. The wavelength-multiplexed polarization entangled photon pair generator as set forth in claim 1, wherein the polarization reversal period of the periodically poled structure is in a linear chirp structure in which the polarization reversal period gradually changes in the direction of the optical axis of the nonlinear optical crystal.

3. The wavelength-multiplexed polarization entangled photon pair generator as set forth in claim 1 or 2, wherein the nonlinear optical crystal is made of lithium tantalate.

4. The wavelength-multiplexed polarization entangled photon pair generator as set forth in claim 1, wherein the spectrometer is made of an arrayed-waveguide grating.

5. A method of generating wavelength-multiplexed polarization entangled photon pairs, comprising:
    forming a periodically poled structure in a nonlinear optical crystal;
    irradiating a pump light having angular frequency of $\omega_p$ to the nonlinear optical crystal;
    conducting a type II phase matching between the pump light and signal/idler light generated within the nonlinear optical crystal, thereby generating a photon pair whose polarized light crosses orthogonal to each other and whose wavelengths are multiplexed;
    branching the wavelength-multiplexed parametric photon pair whose polarized light crosses orthogonal to each other so that an angular frequency becomes $\omega_0, \omega_1, \omega_2, \ldots \omega_{n-2}, \omega_{n-1}, \omega_n$, thereby outputting a wavelength-multiplexed polarization entangled photon pair for each; and
    establishing an angular frequency relation of the wavelength-multiplexed polarization entangled photon pair so that the energy conservation law expressed by equation (6) shown below is satisfied:

$$\begin{aligned}\omega_p &= \omega_0 + \omega_n \\ &= \omega_1 + \omega_{n-1} \\ &= \omega_2 + \omega_{n-2} \\ &\quad \ldots \ .\end{aligned} \quad (6)$$

6. The method of generating wavelength-multiplexed polarization entangled photon pairs as set force in claim 5, wherein
    forming a periodically poled structure having a period of Λ in the nonlinear optical crystal in the direction of the optical axis of the pump light;
    making the period Λ to satisfy equation (7) shown below; and
    conducting a quasi phase matching between the pump light and the signal/idler light generated within the polarization entangled photon pair generator:

$$k_p = k_s + k_i + 2\pi/\Lambda \quad (7)$$

where, $k_p$, $k_s$, and $k_i$ respectively represent a wave vector of the pump light entering the nonlinear optical crystal, a wave vector of the signal light generated within the nonlinear optical crystal, and a wave vector of the idler light generated within the nonlinear optical crystal.

7. The method of generating wavelength-multiplexed polarization entangled photon pairs as set forth in claim 6, wherein making the polarization reversal period of the periodically poled structure to be a linear chirp structure in which the polarization reversal period gradually changes in the direction of the optical axis of the nonlinear optical crystal.

8. The method of generating wavelength-multiplexed polarization entangled photon pairs as set forth in one of claims 5 to 7, wherein the nonlinear optical crystal is lithium tantalate.

9. The method of generating wavelength-multiplexed polarization entangled photon pairs as set forth in claim 5, wherein the branching is conducted using an arrayed-waveguide grating.

10. The wavelength-multiplexed polarization entangled photon pair generator as set forth in claim 4, wherein the arrayed-waveguide grating comprises: an input waveguide; a first lens waveguide connected to the input waveguide; an arrayed waveguide connected to the output terminal of the first lens waveguide; a second lens waveguide connected to the output terminal of the arrayed waveguide; and an output waveguide connected to the output terminal of the second lens waveguide.

* * * * *